United States Patent [19]

Sato et al.

[11] Patent Number: 5,360,665
[45] Date of Patent: Nov. 1, 1994

[54] FILM FOR THERMAL STENCIL SHEETS HAVING SPECIFIC THERMAL STRESSES AND SHRINKAGE

[75] Inventors: Yoshinori Sato, Yamato; Yoshitugu Funada, Yokohama; Yoshitaka Houseki, Hikone; Koji Nagura, Nagahama, all of Japan

[73] Assignee: Diafoil Hoechst Company, Ltd., Tokyo, Japan

[21] Appl. No.: 932,548

[22] Filed: Aug. 20, 1992

[30] Foreign Application Priority Data

Aug. 30, 1991 [JP] Japan ................... 3-220075

[51] Int. Cl.$^5$ ............................................. B32B 5/16
[52] U.S. Cl. ................................... 428/323; 428/331; 428/333; 428/338; 428/340; 428/480
[58] Field of Search ............... 428/323, 327, 331, 333, 428/338, 340, 480, 910

[56] References Cited

U.S. PATENT DOCUMENTS

| | | | |
|---|---|---|---|
| 5,061,565 | 10/1991 | Aoki et al. | 428/409 |
| 5,085,933 | 2/1992 | Katoh et al. | 428/332 |
| 5,089,341 | 2/1992 | Yoshimura et al. | 428/412 |
| 5,100,719 | 3/1992 | Endo et al. | 428/213 |
| 5,106,681 | 4/1992 | Endo et al. | 428/323 |
| 5,188,881 | 2/1993 | Sugiyama et al. | 428/143 |

FOREIGN PATENT DOCUMENTS

| | | |
|---|---|---|
| 0307475 | 3/1989 | European Pat. Off. |
| 0423402 | 4/1991 | European Pat. Off. |
| 62-282984 | 12/1987 | Japan |
| 63-286395 | 11/1988 | Japan |

*Primary Examiner*—Paul J. Thibodeau
*Assistant Examiner*—H. Thi Le
*Attorney, Agent, or Firm*—Foley & Lardner

[57] ABSTRACT

A novel film material for thermal stencil sheets is disclosed. The film comprises a biaxially stretched polyester film which contains 0.1–5.0% of fine particles having an average diameter of 0.05–2.0 μm and has a melting point of 170°–230° C. and a thickness of 0.5–2.5 μm and the maximum value of an average longitudinal and transversal thermal construction stress of the film at a temperature of 100°–160° C. is 500–1500 g/mm$^2$. The film for heat-sensitive mimeographic printing stencil sheets of the present invention is excellent in handling property sensitivity to thermal perforation, resolution in printing, tone property and curling resistance and thus the invention is industrially very significant.

17 Claims, No Drawings

FILM FOR THERMAL STENCIL SHEETS HAVING SPECIFIC THERMAL STRESSES AND SHRINKAGE

FIELD OF THE INVENTION

The present invention relates to a polyester film for thermal stencil sheets for thermal mimeographic printing. More particularly, the invention relates to a film for thermal stencil sheets, which has excellent operation properties, sensitivity to perforation (stencil formation), resolution and tone gradation in printing and is free from curling in stencil formation.

BACKGROUND OF THE INVENTION

For thermal stencil sheets, there have been conventionally used laminates of porous thin tissue paper and film of thermoplastic resins such as polyester. For a film used for such purpose, following properties are required.

(1) To have good sensitivity to perforation or pierceability (stencil formation). That is, the film should melt with a small amount of heat energy and have a sufficient thermal constriction property to form pierced holes of suitable sizes so that clear image is created in printing.

(2) To have strength and modulus of elasticity sufficient to stand working during the lamination with thin tissue paper and printing.

(3) To be able to give clear tone gradation. That is, when the film is used for stencil sheets, a film which may melt at the vicinities of holes to be formed by thermal piercing is not suitable because such a film does not give clear tone gradation in printing. The film should have thermal pierceability which makes clear difference between the points pierced and not pierced.

In addition to the above requirements, the film should have good productivity in manufacturing thereof. Specifically the film should have good drawability free from rupture and other troubles. It should have good slittability and good windability free from wrinkling and irregular winding when it is wound up.

There have been proposed use for such purpose of a biaxially stretched thermoplastic resin film, whose printing property is improved by specifying thermal characteristics thereof (Laying-Open Patent Application No. 62-149496) or by specifying thermal constriction properties thereof (Laying-Open Patent Publication No. 62-282983). However, they do not satisfy all the above requirements.

We conducted an intensive study to solve the problems and we found that a biaxially oriented polyester film which contains fine particles having a specified particular melting point and thermal constriction stress is suitable for thermal stencil sheets and thus completed the present invention.

DISCLOSURE OF THE INVENTION

The gist of the present invention resides in a film for thermal stencil sheets characterized in that the film comprises a biaxially stretched polyester film which contains 0.1–5.0 wt % of fine particles having an average diameter of 0.05–2.0 $\mu$m and has a melting point of 170°–230° C. and a thickness of 0.5–2.5 $\mu$m and the maximum value of an average of longitudinal and transversal thermal constriction stresses of the film at a temperature of 100°–160° C. is 500–1500 g/mm$^2$.

The invention is now described in detail.

The term polyester as used in this specification means a polyester which comprises an aromatic dicarboxylic acid as a main acid component and an alkylene glycol as a main glycol component. Examples of the aromatic dicarboxylic acids are terephthalic acid, isophthalic acid, 2,6-nahthalenedicarboxylic acid, etc. Examples of the glycols are ethylene glycol, trimethylene glycol, tetramethylene glycol neopentyl glycol, 1,4-cyclohexane dimethanol, etc.

The above described polyester may be those comprise one dicarboxylic acid and one glycol, but copolymers comprising three or more components are preferred. Examples of copolymerizable components are diethylene glycol, polyalkylene glycol, dicarboxylic acids such as adipic acid, sebacic acid, etc., oxycarboxylic acids such as p-hydroxybenzoic acid, etc. in addition to the above described.

At any rate, the composition of the resin is selected so that the melting point of the resulting film is 170°–230° C., preferably 170°–220° C. and more preferably 190°–210° C. With a melting point in excess of 230° C., the amount of thermal energy required for perforation or piercing is too large and sensitivity to perforation is inferior. With a melting point lower than 170° C., tone gradation of the printed image is poor.

The intrinsic viscosity of the polyester used in the present invention is usually 0.40 or more, preferably 0.50–1.0. With an intrinsic viscosity smaller than 0.40, productivity of the film is poor and mechanical strength thereof is insufficient.

The glass transition point of the film used in the present invention should preferably be 60° C. or higher. With a glass transition point of lower than 60° C., the film has tendency to curl when it is heated in the stencil formation step.

The thickness of the film of the present invention should be 0.5–2.5 $\mu$m, preferably 1.0–2.0 $\mu$m. The thinner the film, the smaller the heat transfer distance and the thermal energy required for perforation, and pierceability is improved, and thus the resolution and image quality in printing are improved. When the thickness is less than 0.5 $\mu$m, however, printed image is not clear and irregularity in tone occurs and, moreover, productivity and windability are poor in production of the film. With a thickness of in excess of 2.5 $\mu$m, the pierceability is poor and thus irregularity in tone in printing is caused.

The film of the present invention is provided with suitable slipperiness by roughening the surface thereof in order to improve windability in production, operability in laminating and printing and preventing adhesion of the film to the thermal head due to fusion of the film. Specifically, the surface of the film is suitably roughened by incorporation of 0.1–5.0 wt %, preferably, 0.1–3.0 wt % of fine particles having average particle size of 0.05–2.0 $\mu$m. Examples of the fine particles are those of calcium carbonate, magnesium carbonate, barium carbonate, calcium sulfate, barium sulfate, calcium phosphate, lithium phosphate, magnesium phosphate, lithium fluoride, aluminum oxide, silicon oxide, titanium oxide, kaolin, talc, carbon black, silicon nitride, boron nitride and cross-linked high polymers as described in Patent Application Publication No. Sho 59-5216 but not limited to these. The particles can be of a single species or a blend of two or more species. When two or more species of particles are used, the content and the particle size must be within the abovedescribed ranges. If the particle size is smaller than 0.05 $\mu$m or the particle content is smaller than 0.1 wt %, the surface roughness of the film is insufficient. Particle sizes of in excess of 2.0 μm or particle contents of in excess of 5.0 wt % are undesirable, because the surface roughness of the resulting film is excessively high and, therefore, irregularities in heat transfer and perforation are caused resulting in poor resolution and poor quality of printed image.

A film having a suitably roughened surface can be obtained in accordance with the present invention as described above. However, conditions are selected so that the center line average roughness (Ra) is 0.015–0.5 μm, preferably 0.02–0.3 μm in order to secure highly satisfactory operability, resolution and image quality in printing.

The film of this invention is very thin but it has good operability and durability in printing secured by providing the film with tensile modulus of elasticity of not lower than 300 kg/mm² and preferably not lower than 350 kg/mm² in both longitudinal and transversal directions.

The film of the present invention must have a specified thermal constriction stress. That is, the maximum value of the average of the longitudinal and transversal constriction stresses is in a range of 500–1500 g/mm² and preferably 550–1000 g/mm² at 100°–160° C. If this value is less than 500 g/mm², perforation of sufficient size cannot be achieved, that is, the perforation sensitivity is poor. If the value is in excess of 1500 g/mm², the film remarkably curls when a stencil is prepared. It is desirable that the average of longitudinal and transversal thermal constriction stresses is in excess of 500 g/mm² in the range of 100°–160° C. plus 30° C. or more.

The average of the longitudinal and transversal thermal constrictions of the film of the present invention is between 15 and 55% and should preferably be 15–50 % at 100° C. and 30–50% at 150° C.

Now preparation of the polyester film of the present invention will be described below. The polymer is fed into a known melt-extrusion apparatus represented by extruder and melted at a temperature higher than the melting point of the polymer. The molten polymer is extruded through a slit form die onto a rotated cooling drum to quench the polymer to a temperature lower than the glass transition point of the polymer. Thus a substantially amorphous unstretched sheet is obtained. In this operation, it is desirable to employ the electrostatic pinning method and/or to apply a liquid to the film or the drum surface in order to achieve tight contact of the sheet and the rotated cooling drum.

That is, the electrostatic pinning method is conducted as follows. Usually an electrode wire is stretched in the direction perpendicular to the direction of sheet flow (machine direction) over the running sheet and direct current of 5–10 kV is applied thereto, whereby the sheet is statically charged causing tight contact to the drum. The method of tight contact by application of a liquid is conducted as follows. A liquid is applied on the whole surface or some parts of the surface (both ends, for instance) of the drum, which brings about intimate contact of the film and the drum. The two methods can be simultaneously employed.

The thus obtained sheet is biaxially stretched to make it into film.

The stretching conditions are as follows. The above described unstretched sheet is stretched in one direction at a temperature of 50°–120° C., and preferably 50°–110° C. by a factor of 3.0–7 and preferably 3.5–7 by means of a drawing machine of roller type or tenter type. Then the sheet is stretched in the direction perpendicular to that of the first stretching at a temperature of preferably 50°–125° C. and more preferably 55°–115° C. by a factor of 3.0–7, preferably 3.5–7, and more preferably 4.0–7 and thus a biaxially stretched film is obtained. Each stretching can be carried out in two steps or more. In such a case, the total stretching ratio should preferably be within the above mentioned range. It is also possible to conduct the biaxial stretching simultaneously so that the area of the stretched film is 10–40 times that of the unstretched sheet.

The thus obtained film is heat-treated. However, the film can be further stretched longitudinally and/or transversally prior to the heat treatment, if desired.

In the present invention, it is desirable to stretch a sheet by a factor of 15 or more, not to employ the post-stretch heat treatment or to carry out the heat treatment at a temperature of not higher than 130° C. for 1 sec–10 min with stretching at a ratio of 30% or less or without stretching.

In the present invention, the polyester used as the material for the film can contain another polymer (polyethylene, polystyrene, polycarbonate, polysulfone, polyphenylene sulfide, polyamide, polyimide, etc., for instance) in an amount not more than 10 wt % of the total polymers. Also, it can contain additives such as anti-oxidant, thermal stabilizer, lubricant, anti-static agent, dyes, pigments, etc. as desired.

The thus obtained polyester film of the present invention is laminated with a sheet of thin tissue paper with any known adhesive. Thus a film provided with excellent thermal pierceablity, which produces an excellent stencil sheet, which will exhibit excellent resolution and tone gradation in printing.

SPECIFIC DESCRIPTION OF THE INVENTION

The invention will now be described in detail by way of working examples. However, the invention is not limited to these working examples as long as it is worked within the scope of the gist of the invention. First, the methods of measurements of physical properties employed in the present invention are described.

(1) Average Particle Diameter of Fine Particles

Particle size was measured by means of a centrifugal sedimentation particle size analyzer "SA-CP3" manufactured by Shimadzu Seisakusho in accordance with the sedimentation method based on the Stokes' resistance law. The median value (50% value) of the distribution of measured particle diameters (equivalent sphere values) was taken as average particle size ($d_{50}$).

(2) Average of Longitudinal and Transversal Thermal Constriction

A sample film strip was heat-treated for 3 minutes in an oven kept at predetermined temperatures (100° C. and 150° C.) under the tensionless condition, lengths of the film sample before and after the heat-treatment were measured and thermal constriction was calculated in accordance with the following formula.

Thermal constriction (%)=(length before heat-treatment−length after heat-treatment)/(length before heat-treatment)×100

Measurement was carried out on samples taken from 5 different sections along the longitudinal and transversal directions and the average value was determined.

(3) Melting Point and Glass Transition Point (Tg)

These were measured by means of a differential scanning calorimeter (DSC) "SSC580DSC20" manufactured by Seiko Denshi Kogyo KK. The measurement conditions were as follows. 10 mg of a film sample was mounted on the apparatus, heated at a rate of 10° C./min and measurement was carried out in a range of 0°–300° C. with the melting point taken as the peak of melting heat absorption. The sample was quenched with liquid nitrogen after it was kept at 300° C. for 5 minutes and further the glass transition temperature was determined by heating the sample at a rate of 10° C./min in the range of 0–200° C. The glass transition point was determined as parallel displacement of the base line when the DSC curve bent in accordance with the change of specific heat. The intersection of the tangent of the base line at the temperatures below the bending point and the tangent at the point where the inclination of the bending curve became maximum in the bending range was regarded as the starting point of bending and this point was taken as the glass transition point.

(4) Centerline Average Roughness

The centerline average roughness (Ra) was measured as described below using a surface roughness meter "SE-3F" manufactured by KK Kosaka Kenkyusho. A portion having a length L (2.5 mm) was taken from a cross-section curve of a film in the direction of the centerline. The centerline was taken as the x axis and the direction of the thickness was taken as the y axis with proper multiplication and the data was expressed as a function $y=f(x)$. The value calculated in accordance with the following formula was indicated in μm. Ten (10) cross-section curves were taken from a film, from which respectively 2.5 mm portions were taken. Centerline average roughnesses were determined and an average was calculated. The radius of curvature of the stylus tip was 2 μm, the load was 30 mg and the cutoff value was 0.08 mm.

$$Ra = 1/L \int_0^L |f(x)| dx$$

(5) Average of Longitudinal End Transversal Thermal Constriction Stresses

A strip having a width of 10 mm was cut out from a film. One end thereof was secured to the chuck of a load detector and the other end was secured to a fixed chuck, wherein the distance between the two chucks was 50 mm. The so-mounted film was immersed in an oil bath of a predetermined temperature initially without load and the produced maximum in 10 seconds stress was measured and thermal constriction stress was calculated from the cross-sectional area of the film before immersion. The bath temperature was 100°, 110°, 120°, 130°, 140°, 150° and 160° C., the stress was measured with respect to 5 samples taken at 5 different positions respectively in the longitudinal and transversal directions and an average was obtained.

(6) Practical Applicability to Thermal Mimeographic Stencil

A film was laminated with a sheet of thin tissue paper to give a stencil sheet. Printing stencils were prepared by applying 0.09 mJ and 0.12 mJ of energy from a thermal head to the sheet through a character (letters) image and a 16 step tone gradation transparent. The prepared stencils were microscopically observed from the film side for condition of perforation at the image portion. The following items were evaluated.

(i) Perforation Sensitivity

Desired perforation was reliably effected and the size of pierced holes was satisfactory. Usable but perforation partially did not occur and some perforations were insufficient in size.

Perforation was not effected in many places and the size of the pierced holes was insufficient. Unusable.

(ii) Tone Quality

◯ Desired perforation was reliably effected and good tone gradation was secured at high density portions.

Δ Tone gradation was slightly poor at high density portions and irregularity in perforation occurred in low density portions.

✕ At high density portions, almost all the film was removed and no tone gradation was recognized at steps 4–7.

(iii) Image Quality

◯ Printed image (characters) was good and clear free from density irregularity and blotting.

Δ Slight irregularity in density and blotting were observed and printed image was not quite clear.

✕ Irregularity in density or blotting or scratch clearly appeared.

EXAMPLE 1

Seventy-nine (79) parts of dimethyl terephthalate, 21 parts of dimethyl isophthalate, 64 parts of ethylene glycol and 0.11 part of calcium carbonate monohydrate were taken in a reactor and transesterification reaction was carried out. The reaction was started at 180° C. and the reaction temperature was raised as the formed methanol was distilled off. The temperature reached 230° C. after 4 hours and the transesterfication was substantially completed.

Then 0.07 part of triethyl phosphate was added and thereafter further 0.2 part of silica particles having an average particle diameter of 1.2 μm d and 0.04 part of antimony trioxide were added. The polycondensation reaction was conducted by the ordinary procedures. The reaction was carried out as the temperature was gradually raised and the pressure was gradually reduced from normal pressure. After 2 hours the temperature reached 270° C. and the pressure reached 0.3 mmHg. Five (5) hours after the polycondensation reaction was started, the reaction was terminated and the produced polymer was taken out by pressurizing with nitrogen. The intrinsic viscosity of the obtained copolyester (A) was 0.68.

The obtained copolyester (A) was extruded at 280° C. onto a rotating cooling drum kept at 40° C. to quench the polymer using the electrostatic pinning method. Thus a substantially amorphous sheet having a thickness of 26 μm was obtained. The sheet was stretched longitudinally at 80° C. by a factor of 4.1 and transversally at 95° C. by a factor of 4.5. Finally the sheet was heat-treated at 100° C. for 6 seconds and a biaxially stretched film having a thickness of 1.5 μm was obtained.

EXAMPLE 2

In the same manner as in Example 1, copolymerized polyethylene terephthalate (B), which comprised 18 mol % of ethylene isophthalate and contained 0.3 wt % of titanium oxide particles having an average particle diameter of 0.3 μm, was prepared. The intrinsic viscosity thereof was 0.67.

The thus obtained copolyester (B) was made into a biaxially stretched film having a thickness of 1.6 μm in the same manner as in Example 1 except that the heat treatment was carried out at 130° C.

EXAMPLE 3

In the same manner as in Example 1, copolymerized polyethylene terephthalte (C), which comprised 17 mol % of ethylene isophthalate units and contained 0.4 wt % of spherical silica particles having an average particle, diameter of 1.2 μm, was prepared. The intrinsic viscosity thereof was 0.66.

The thus obtained copolymerized polyethylene terephthalate (C) was made into a substantially amorphous sheet having a thickness of 26 μm in the same manner as in Example 1. The sheet was stretched longitudinally at 80° C. in two steps by a factor of 2.9 and at 75° by a factor of 1.4 and then transversally at 95° C. by a factor of 4.5. Thus a biaxially stretched film having a thickness of 1.5 μm was obtained.

COMPARATIVE EXAMPLE 1

Copolyester (D) comprising 21 mol % of ethylene isophthalate was prepared using polyester (A) used in Example 1 in the same manner but incorporating no silica particles. From this copolyester, a biaxially stretched film having a thickness of 1.5 μm was obtained.

The film was remarkably poor in slipperiness and difficult to wind up into a roll because it contained no fine particles, which was a requirement in the present invention.

COMPARATIVE EXAMPLE 2

A biaxially stretched film having a thickness of 1.5 μm using the same material as of Example 3 in the same manner as in Example 3 except that heat treatment was carried out at 170° C.

COMPARATIVE EXAMPLE 3

Using a polyethylene terephthalate copolymer which comprised 8 mol % of ethylene isophthalate units, contained 0.2 wt % of silica particles having an average particle diameter of 1.2 μm and had an intrinsic viscosity of 0.69, a biaxially stretched film having a thickness of 1.6 μm was prepared.

COMPARATIVE EXAMPLE 4

Using a polyethylene terephthalate copolymer which comprised 35 mol % of ethylene isophthalate units, contained 0.15 wt % of silica particles having an average particle diameter of 1.2 μm and had an intrinsic viscosity of 0.64, a biaxially stretched having a thickness of 1.4 μm was prepared.

COMPARATIVE EXAMPLE 5

A biaxially stretched film having a thickness of 3 μm was prepared in the same manner as in Example 1 except that the copolymer was extruded at a higher rate.

The films obtained as described above were respectively laminated with a sheet of thin tissue paper and made into heat-sensitive mimeographic stencil sheets in the ordinary manner. Using these sheets, mimeographic printing was carried out.

Physical properties and printing characteristics of the stencil sheets are summarized in Tables 1 and 2.

TABLE 1

| | m.p. (°C.) | Average of Longitudinal & Transversal Constriction Stress Max. Value (g/mm²) | Thermal Constriction | | Centerline Average Roughness (μm) |
| --- | --- | --- | --- | --- | --- |
| | | | 100° C. | 150° C. | |
| Ex. 1 | 197 | 750 | 34 | 55 | 0.038 |
| Ex. 2 | 208 | 850 | 17 | 40 | 0.035 |
| Ex. 3 | 211 | 800 | 32 | 50 | 0.055 |
| Comp. Ex. 1 | 198 | 770 | 35 | 60 | 0.002 |
| Comp. Ex. 2 | 212 | 450 | 4 | 18 | 0.053 |
| Comp. Ex. 3 | 240 | 950 | 28 | 50 | 0.043 |
| Comp. Ex. 4 | 162 | 130 | 30 | 70 | 0.034 |
| Comp. Ex. 5 | 197 | 720 | 35 | 55 | 0.044 |

TABLE 2

| | Applicability (0.09 mJ/0.12 mJ) | | |
| --- | --- | --- | --- |
| | Sensitivity Perforation | Tone Gradient | Image Quality |
| Ex. 1 | O/O | O/O | O/O |
| Ex. 2 | Δ/O | O/O | O/O |
| Ex. 3 | O/O | O/O | O/O |
| Comp. Ex. 1 | Δ/O | O/Δ | Δ/O |
| Comp. Ex. 2 | X/Δ | Δ/Δ | X/Δ |
| Comp. Ex. 3 | X/Δ | X/Δ | X/Δ |
| Comp. Ex. 4 | X/X | X/X | X/X |
| Comp. Ex. 5 | X/X | X/Δ | X/X |

The films of Examples 1–3 satisfied the requirements of the present invention and, therefore, handling was easy in manufacturing thereof and in preparation of printing stencils. The printing stencil sheets made of these films had excellent sensitivity to thermal perforation and thus exhibited good printing characteristics.

The film of Comparative Example 4 had low constriction stress, the film of Comparative Example 3 had a high melting point and the films of Comparative Examples 4 and 5 had a low thermal constriction at 150° C. Therefore, they were poor in sensitivity to thermal perforation.

The film for thermal stencil sheets of the present invention excellent in handling property, sensitivity to thermal perforation, resolution in printing, tone property and curling resistance and thus the invention is industrially very significant.

What we claim is:

1. A film for thermal stencil sheets, comprising a biaxially stretched polyester film which contains 0.1–5.0 wt % of fine particles having an average diameter of 0.05–2.0 μm, wherein the polyester film has a melting point of 170°–230° C., an intrinsic viscosity of 0.4 to 1.0, a thickness of 0.5–2.5 μm, wherein the maximum value of an average of longitudinal and transversal thermal constriction stresses at a temperature 100°–160° C. of the polyester film is 550–1500 g/mm², and wherein the average of longitudinal and transversal constriction at 150° C. of the polyester film is 30 to 55%.

2. A film for thermal stencil sheets as claimed in claim 1, which comprises a biaxially stretched polyester film which contains 0.1–3.0 wt % of fine particles having an average diameter of 0.05–2.0 μm, wherein the polyester has a melting point of 170°–220° C. and a thickness of 1.5–2.0 μm and the maximum value of an average longitudinal and transversal thermal constriction stress at a temperature of 100°–160° C. is 550–1000 g/mm².

3. A film for thermal stencil sheets as claimed in claim 2, wherein the polyester has a melting point of 190°–210° C.

4. A film as claimed in claim 1, wherein the polyester film comprises a polyester formed from an aromatic dicarboxylic acid and an alkylene glycol.

5. A film as claimed in claim 4, wherein the polyester film comprises a copolyester formed from at least three components.

6. A film as claimed in claim 1, wherein the intrinsic viscosity is between 0.5 and 1.

7. A film as claimed in claim 1, wherein the polyester film comprises a polyester having a glass transition point of lower than 60° C.

8. A film as claimed in claim 1, wherein the center line average roughness of the polyester film is 0.015 to 0.5 micrometers.

9. A film as claimed in claim 8, wherein the center line average roughness is 0.02 to 3 micrometers.

10. A film as claimed in claim 1, wherein the polyester film has a tensile modulus of elasticity of not lower than 300 kg/mm² in both the longitudinal and the transversal directions.

11. A film as claimed in claim 1, wherein the average of longitudinal and transverse constriction is between 30 and 50% at 150° C. and between 15 and 50% at 100° C.

12. A film as claimed in claim 1, which comprises a polymer other than polyester in an amount of up to 10 weight percent.

13. A stencil sheet comprising a film as claimed in claim 1.

14. A film as claimed in claim 1, wherein the polyester film contains only a single polyester, such that the film only has one melting point.

15. A film as claimed in claim 1, wherein the polyester film comprises a polyester formed from dimethyl terephthalate, ethylene glycol, and dimethyl isophthalate.

16. A film as claimed in claim 1, wherein the fine particles comprise silica or titanium dioxide.

17. A film as claimed in claim 1, wherein the polyester film comprises a polyethylene terephthalate comprising ethylene isophthalate units.

* * * * *